United States Patent
Mayhew et al.

(10) Patent No.: US 10,457,286 B1
(45) Date of Patent: Oct. 29, 2019

(54) DRIVER SCHEDULED VEHICLE COAST DOWNSHIFT CONTROL AND SHIFT DIAGNOSTIC TECHNIQUES

(71) Applicants: William Mayhew, Ann Arbor, MI (US); Stephen Tokish, Sylvania, OH (US)

(72) Inventors: William Mayhew, Ann Arbor, MI (US); Stephen Tokish, Sylvania, OH (US)

(73) Assignee: FCA US LLC, Auburn Hills, MI (US)

( * ) Notice: Subject to any disclaimer, the term of this patent is extended or adjusted under 35 U.S.C. 154(b) by 1 day.

(21) Appl. No.: 15/974,224

(22) Filed: May 8, 2018

(51) Int. Cl.
| | |
|---|---|
| *B60W 10/06* | (2006.01) |
| *B60W 10/11* | (2012.01) |
| *B60W 30/18* | (2012.01) |
| *F16H 61/12* | (2010.01) |
| *F16H 59/18* | (2006.01) |
| *F16H 59/44* | (2006.01) |
| *F16H 59/36* | (2006.01) |

(52) U.S. Cl.
CPC ...... *B60W 30/18072* (2013.01); *B60W 10/06* (2013.01); *B60W 10/11* (2013.01); *F16H 61/12* (2013.01); *B60W 2510/0638* (2013.01); *B60W 2520/10* (2013.01); *B60W 2540/10* (2013.01); *B60W 2710/0644* (2013.01); *B60W 2710/0666* (2013.01); *B60W 2710/1005* (2013.01); *F16H 59/18* (2013.01); *F16H 59/44* (2013.01); *F16H 2059/366* (2013.01); *F16H 2061/1208* (2013.01)

(58) Field of Classification Search
CPC ............ B60W 10/06; B60W 10/11; B60W 30/18072; B60W 30/19; B60W 2030/18081; B60W 2510/0638; B60W 2520/10; B60W 2540/10; B60W 2710/1005; F16H 61/12; F16H 2061/1208
See application file for complete search history.

(56) References Cited

U.S. PATENT DOCUMENTS

| | | |
|---|---|---|
| 4,671,139 A | 6/1987 | Downs et al. |
| 6,090,008 A | 7/2000 | Hoshiya et al. |
| 6,254,510 B1 | 7/2001 | Rauch et al. |

(Continued)

FOREIGN PATENT DOCUMENTS

EP   0482689 B1   6/1995

*Primary Examiner* — Edwin A Young
(74) *Attorney, Agent, or Firm* — Ralph E Smith

(57) ABSTRACT

Systems and methods for a vehicle automatic transmission comprising a dog clutch utilize a set of sensors configured to measure accelerator pedal position, torque generating device speed, and vehicle speed, and a controller configured to detect whether a coast downshift of the transmission to a desired gear ratio and involving the dog clutch is to be performed. In response to detecting that the coast downshift involving the dog clutch is to be performed, the controller determines whether the accelerator pedal has been depressed indicating a request for increased torque generating device speed/torque, when the accelerator pedal is depressed, performs a downshift of the transmission, while the accelerator pedal is not depressed, determines whether a synchronization point of the vehicle speed relative to the torque generating device speed has been reached and when the vehicle/torque generating device speed synchronization point has been reached, performs the downshift of the transmission.

12 Claims, 2 Drawing Sheets

(56) References Cited

U.S. PATENT DOCUMENTS

| | | | |
|---|---|---|---|
| 7,294,092 B2 | 11/2007 | Walker et al. | |
| 8,771,144 B2 | 7/2014 | Dickinson et al. | |
| 2008/0248920 A1* | 10/2008 | Eriksson | F16H 61/0213 477/74 |
| 2010/0151988 A1* | 6/2010 | Tabata | B60K 6/442 477/3 |
| 2012/0108384 A1* | 5/2012 | Tabata | B60K 6/445 477/3 |
| 2014/0200111 A1* | 7/2014 | Murakami | B60K 6/48 477/4 |

* cited by examiner

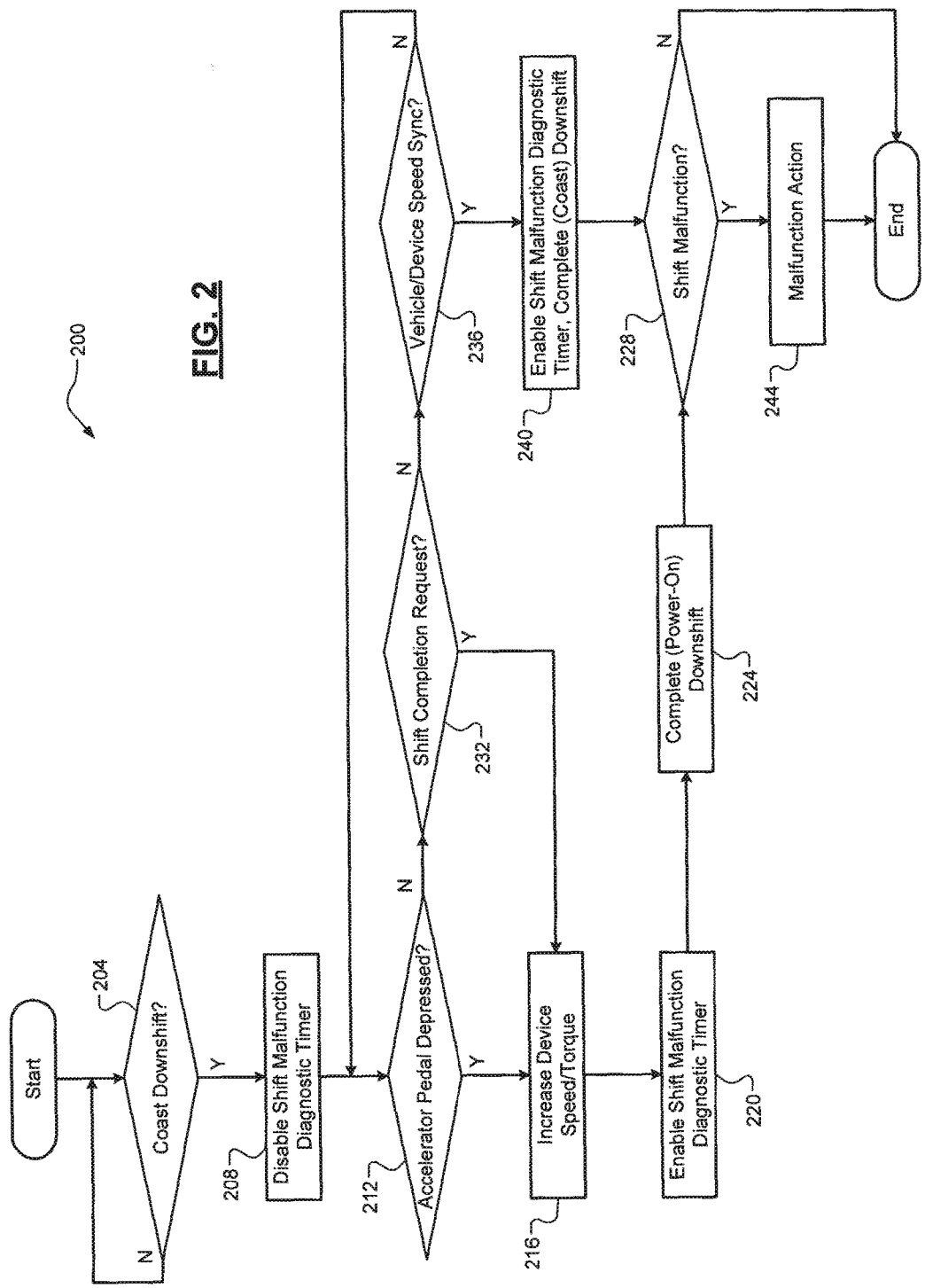

DRIVER SCHEDULED VEHICLE COAST DOWNSHIFT CONTROL AND SHIFT DIAGNOSTIC TECHNIQUES

FIELD

The present application generally relates to automatic transmissions and, more particularly, to techniques for driver scheduled coast downshift control and shift diagnostic techniques.

BACKGROUND

A transmission of a vehicle multiplies and transfers drive torque from an input shaft of a torque generating device (an engine, an electric motor, etc.) to a driveline. For an automatic transmission, a gear ratio of a planetary gear set is selected by supplying hydraulic pressure to on-coming and off-going clutches. For a coast downshift, the vehicle is decelerating and the downshift is scheduled and performed based on various vehicle operating parameters. This coast downshift can use positive torque from the torque generating device, which could be perceived by the driver of the vehicle as noise/vibration/harshness (NVH). This controller-based shift patterning is also potentially undesirable to a driver who may not want the transmission to downshift. Accordingly, while such automatic transmission systems work well for their intended purpose, there remains a need for improvement in the relevant art.

SUMMARY

According to one example aspect of the invention, a control and diagnostic system for an automatic transmission of a vehicle is presented. In one exemplary implementation, the system comprises: a set of sensors configured to measure a position of an accelerator pedal of the vehicle, a speed of a torque generating device of the vehicle, and a speed of the vehicle and a controller configured to detect whether a coast downshift of the transmission to a desired gear ratio and involving the dog clutch is to be performed and, in response to detecting that the coast downshift involving the dog clutch is to be performed: disabling a shift malfunction diagnostic timer, determining whether the accelerator pedal has been depressed indicating a request for increased torque generating device speed/torque, when the accelerator pedal is depressed, enabling the shift malfunction diagnostic timer and performing a downshift of the transmission, while the accelerator pedal is not depressed, determining whether a synchronization point of the vehicle speed relative to the torque generating device speed has been reached, and when the vehicle/torque generating device speed synchronization point has been reached, enabling the shift diagnostic timer and performing the downshift of the transmission, and detecting a shift malfunction when the shift malfunction diagnostic timer expires before the desired gear ratio of the transmission is achieved.

In some implementations, the controller is further configured to while the accelerator pedal is not depressed: detect a shift completion request and in response to detecting the shift completion request, commanding the torque generating device to increase torque generating device speed/torque, enabling the shift malfunction diagnostic timer, and performing the downshift of the transmission. In some implementations, the shift completion request is an external request that is not related to shift quality. In some implementations, the shift completion request is generated after expiration of a coast downshift timeout timer. In some implementations, the transmission is a nine-speed dog clutch automatic transmission. In some implementations, downshifts of the nine-speed dog clutch automatic transmission involving the dog clutch or another dog clutch include 5th gear to 4th gear, 8th gear to 7th gear, and 9th gear to 7th gear.

According to another example aspect of the invention, a control and diagnostic method for an automatic transmission of a vehicle is presented. In one exemplary implementation, the method comprises: determining, by a controller and based on signals from a set of sensors, a position of an accelerator pedal of the vehicle, a speed of a torque generating device of the vehicle, and a speed of the vehicle, detecting, by the controller, whether a coast downshift of the transmission to a desired gear ratio and involving the dog clutch is to be performed and in response to detecting that the coast downshift involving the dog clutch is to be performed: disabling, by the controller, a shift malfunction diagnostic timer, determining, by the controller, whether the accelerator pedal has been depressed indicating a request for increased torque generating device speed/torque, when the accelerator pedal is depressed, enabling, by the controller, the shift malfunction diagnostic timer and performing a downshift of the transmission, while the accelerator pedal is not depressed: determining, by the controller, whether a synchronization point of the vehicle speed relative to the torque generating device speed has been reached, and when the vehicle/torque generating device speed synchronization point has been reached, enabling, by the controller, the shift diagnostic timer and performing the downshift of the transmission, and detecting, by the controller, a shift malfunction when the shift malfunction diagnostic timer expires before the desired gear ratio of the transmission is achieved.

In some implementations, the method further comprises while the accelerator pedal is not depressed: detecting, by the controller, a shift completion request and in response to detecting the shift completion request, commanding, by the controller, the torque generating device to increase torque generating device speed/torque, enabling, by the controller, the shift malfunction diagnostic timer, and performing the downshift of the transmission. In some implementations, the shift completion request is an external request that is not related to shift quality. In some implementations, the shift completion request is generated after expiration of a coast downshift timeout timer. In some implementations, the transmission is a nine-speed dog clutch automatic transmission. In some implementations, downshifts of the nine-speed dog clutch automatic transmission involving the dog clutch or another dog clutch include 5th gear to 4th gear, 8th gear to 7th gear, and 9th gear to 7th gear.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

BRIEF DESCRIPTION OF THE DRAWINGS

FIG. 2 is a flow diagram of an example method of driver scheduled coast downshift and a shift diagnostic according to the principles of the present disclosure.

DETAILED DESCRIPTION

Figure 1:
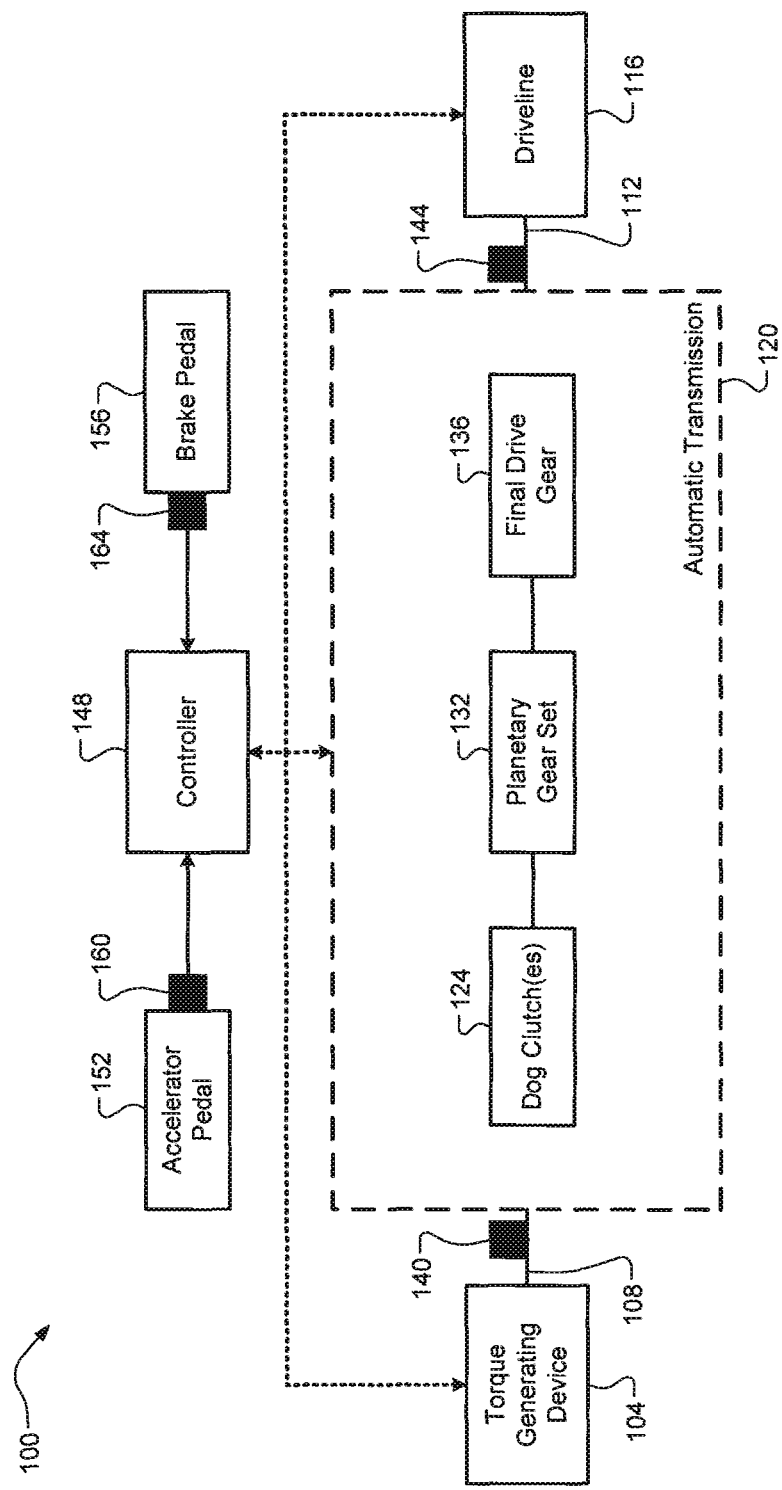
FIG. 1 is a functional block diagram of an example vehicle according to the principles of the present disclosure.

As previously discussed, conventional automatic transmission systems preschedule coast downshifts. In many transmission designs, this involves increasing hydraulic pressure applied to an engaging friction clutch to complete the downshift. In some transmission designs, such as a nine-speed dog clutch transmission, there are shifts that do not include an engaging friction clutch. These shifts instead include dog clutches, which do not allow slippage and thus require an increase in engine torque to achieve the shift. In some circumstances, this engine torque increase is noticed by the vehicle operator, such as via a tachometer or by the audible sound of the engine. Accordingly, improved transmission control systems/methods and shift malfunction diagnostic techniques are presented. The transmission control system/methods perform a coast downshift of a dog-clutch transmission by monitoring accelerator pedal position, vehicle speed, and external shift requests.

More particularly, the systems/methods can wait for the vehicle speed to decrease to a synchronization point where the downshift can be completed without increasing engine speed/torque. During this coastdown period, the driver may tip-in the accelerator pedal. When the driver does so, the systems/methods then perform a power-on downshift and increase engine speed/torque to complete the downshift. Because the driver tipped-in the accelerator pedal, the downshift response will feel as expected (i.e., non-intrusive). An external signal, such as a government-specified timeout, could also cause the systems/methods to intrusively increase the engine speed/torque to complete the downshift. Conventional shift diagnostic routines are typically time-based. That is, if the shift to the desired gear ratio is not achieved within some threshold period, a shift malfunction is detected. The systems/methods will therefore disable this diagnostic timer for these dog clutch coast downshifts as described above to prevent false shift malfunction detections.

Referring now to FIG. 1, a functional block diagram of an example vehicle 100 is illustrated. The vehicle 100 includes a torque generating device 104 that is configured to generate drive torque at an input shaft 108. Non-limiting examples of this device 104 include an internal combustion engine, an electric motor, and combinations thereof. The drive torque is transferred from the input shaft 108 to an output shaft 112 of a driveline 116 via an automatic transmission 120 comprising at least one dog clutch 124. In one exemplary implementation, the transmission 120 is a nine-speed dog clutch automatic transmission where there are dog clutches 124 for various downshifts such as $5^{th}$ gear to $4^{th}$ gear, $8^{th}$ gear to $7^{th}$ gear, and $9^{th}$ gear to $7^{th}$ gear. It will be appreciated that the techniques herein could apply to any suitable gearshift involving a dog clutch. The one or more dog clutches 124 connect the input shaft 108 to gears of a planetary gear set 132. The planetary gear set 132 is connected to a final drive gear 136, which is in turn connected to the output shaft 112. Speed sensors 140, 144 measure rotational speed of the input and output shafts 108, 112. These speeds are indicative of engine/motor speed and vehicle speed, respectively. A controller 148 controls operation of the vehicle 100, including controlling the torque generating device 104 (e.g., air/fuel) to achieve a desired drive torque at the input shaft 108. The controller 148 also controls the shifting of the transmission 120.

The controller 148 receives a measured position of an accelerator pedal 152 and a brake pedal 156 from respectively pedal position sensors 160, 164. When the accelerator pedal 152 is actuated, for example, the controller 148 commands the torque generating device 104 to increase its torque output. The controller 148 could also downshift the transmission 120 in response to accelerator pedal actuation, also known as a power-on downshift. During a power-on downshift, clutch synchronization is achieved by a larger change in engine speed than vehicle speed. In some cases, vehicle speed may barely change or may not change at all (e.g., during highway driving). When the brake pedal 156 is actuated, the controller 148 commands the driveline 108 (e.g., a braking system, not shown) to decrease the vehicle speed. The controller 148 could also downshift the transmission 120 in response to brake pedal actuation, also known as a coast downshift. In a coast downshift, engine speed need not change and clutch synchronization can occur by a decrease in transmission output/vehicle speed rather than an increase in engine speed. The controller 148 also performs shift malfunction diagnostic techniques, which are now described in greater detail.

Referring now to FIG. 2, a flow diagram of an example method 200 of controlling a downshift of the transmission 120 and performing shift malfunction diagnostics is presented.

At 204, the controller 148 determines whether a dog clutch coast downshift is to be performed. This determination is made based on a variety of factors, such as engine/motor speed (measured by sensor 140), vehicle speed (measured by sensor 144), a current gear ratio of the transmission 120, and accelerator pedal position (i.e., pedal-off). It will be appreciated that other parameters or functions could factor into the determination of whether a dog clutch coast downshift the transmission 120 is to be performed. When a dog clutch coast downshift is to be performed, the method 200 proceeds to 208. Otherwise the method 200 ends or returns to 204. At 208, the controller 148 disables a shift malfunction diagnostic timer for the dog clutch coast downshift operation. At 212, the controller 148 determines whether the accelerator pedal 152 is actuated or depressed (measured by sensor 160). When the accelerator pedal 152 is actuated or depressed, the method 200 proceeds to 216 where the controller 148 commands the torque generating device 104 to increase its speed/torque output, enables the shift malfunction diagnostic timer at 220, and then at 224 the (power-on) downshift is completed (e.g., because the driver has already provided the request for increased device speed/torque). The method 200 then proceeds to 228.

When the accelerator pedal 152 is not actuated or depressed at 212, the method 200 proceeds to 232. At 232, the controller 148 determines whether a shift completion request has been received or detected. As previously discussed, there could be external factors or signals (not relating to shift quality) that could force the controller 148 to complete the downshift operation. For example only, there could be a government-specified timeout or a maximum amount of time that a vehicle is allowed to coast before a downshift is to be performed. When the shift completion request has been received or detected, the method 200 proceeds to 216 where the controller 148 commands the torque generating device speed/torque increase. The method 200 then proceeds to 220 where the controller 148 enables the shift malfunction diagnostic timer, the (power-on) downshift is completed at 224 (e.g., because the controller 148 has intrusively requested/commanded increased torque generating device speed/torque in response to detecting the shift completion request at 232), and the method 200 proceeds to 228. When the shift completion request is not received or detected at 232, the method 200 proceeds to 236.

At 236, the controller 148 determines whether a synchronization point has been reached based on a comparison of transmission output/vehicle speed to torque generating device speed. For example, this synchronization point could be where the vehicle speed is within a threshold amount from the torque generating device speed. When the synchronization point has been reached, the method 200 proceeds to 240 where the controller 148 enables the shift diagnostic timer and the (coast) downshift is completed. Note that these could be illustrated/described as two separate steps. The method 200 then proceeds to 228 where the controller 148 determines whether a shift malfunction has occurred. This could be determined, for example, when the desired gear ratio has not been achieved before the timer expires. When no shift malfunction is detected, the method 200 ends or returns to 204. When the shift malfunction is detected, however, the method 200 proceeds to 244 where malfunction action is taken. This could include setting a fault/flag, actuating a malfunction indicator lamp (MIL), or any other suitable malfunction related action.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control and diagnostic system for an automatic transmission of a vehicle, the transmission including a dog clutch, the system comprising:
    a set of sensors configured to measure a position of an accelerator pedal of the vehicle, a speed of a torque generating device of the vehicle, and a speed of the vehicle; and
    a controller configured to detect whether a coast downshift of the transmission to a desired gear ratio and involving the dog clutch is to be performed and, in response to detecting that the coast downshift involving the dog clutch is to be performed:
        disabling a shift malfunction diagnostic timer;
        determining whether the accelerator pedal has been depressed indicating a request for increased torque generating device speed/torque;
        when the accelerator pedal is depressed, enabling the shift malfunction diagnostic timer and performing a downshift of the transmission;
        while the accelerator pedal is not depressed:
            determining whether a synchronization point of the vehicle speed relative to the torque generating device speed has been reached, and
            when the vehicle/torque generating device speed synchronization point has been reached, enabling the shift diagnostic timer and performing the downshift of the transmission; and
        detecting a shift malfunction when the shift malfunction diagnostic timer expires before the desired gear ratio of the transmission is achieved.

2. The system of claim 1, wherein the controller is further configured to while the accelerator pedal is not depressed:
    detect a shift completion request; and
    in response to detecting the shift completion request, commanding the torque generating device to increase torque generating device speed/torque so as to reach the synchronization point, enabling the shift malfunction diagnostic timer, and performing the downshift of the transmission.

3. The system of claim 2, wherein the shift completion request is an external request that is not related to shift quality.

4. The system of claim 3, wherein the shift completion request is generated after expiration of a coast downshift timeout timer.

5. The system of claim 1, wherein the transmission is a nine-speed dog clutch automatic transmission.

6. The system of claim 5, wherein downshifts of the nine-speed dog clutch automatic transmission involving the dog clutch or another dog clutch include $5^{th}$ gear to $4^{th}$ gear, $8^{th}$ gear to $7^{th}$ gear, and $9^{th}$ gear to $7^{th}$ gear.

7. A control and diagnostic method for an automatic transmission of a vehicle, the transmission comprising a dog clutch, the method comprising:
    determining, by a controller and based on signals from a set of sensors, a position of an accelerator pedal of the vehicle, a speed of a torque generating device of the vehicle, and a speed of the vehicle;
    detecting, by the controller, whether a coast downshift of the transmission to a desired gear ratio and involving the dog clutch is to be performed and in response to detecting that the coast downshift involving the dog clutch is to be performed:
        disabling, by the controller, a shift malfunction diagnostic timer;
        determining, by the controller, whether the accelerator pedal has been depressed indicating a request for increased speed/torque from the torque generating device;
        when the accelerator pedal is depressed, enabling, by the controller, the shift malfunction diagnostic timer and performing a downshift of the transmission;
        while the accelerator pedal is not depressed:
            determining, by the controller, whether a synchronization point of the vehicle speed relative to the torque generating device speed has been reached, and
            when the vehicle/torque generating device speed synchronization point has been reached, enabling, by the controller, the shift diagnostic timer and performing the downshift of the transmission; and
        detecting, by the controller, a shift malfunction when the shift malfunction diagnostic timer expires before the desired gear ratio of the transmission is achieved.

8. The method of claim 7, further comprising while the accelerator pedal is not depressed:
    detecting, by the controller, a shift completion request; and
    in response to detecting the shift completion request, commanding, by the controller, the torque generating device to increase torque generating device speed/
torque, enabling, by the controller, the shift malfunction diagnostic timer, and performing the downshift of
the transmission.

9. The method of claim 8, wherein the shift completion request s an external request that is not related to shift quality.

10. The method of claim 9, wherein the shift completion request is generated after expiration of a coast downshift timeout timer.

11. The method of claim 7, wherein the transmission is a nine-speed dog clutch automatic transmission.

12. The method of claim 11, wherein downshifts of the nine-speed dog clutch automatic transmission involving the dog clutch or another dog clutch include $5^{th}$ gear to $4^{th}$ gear, $8^{th}$ gear to $7^{th}$ gear, and $9^{th}$ gear to $7^{th}$ gear.

\* \* \* \* \*